United States Patent
Honda et al.

(10) Patent No.: US 6,829,042 B1
(45) Date of Patent: Dec. 7, 2004

(54) DISTANCE MEASURING APPARATUS AND METHOD USING A PULSED ELECTROMAGNETIC WAVE

(75) Inventors: Tatsuya Honda, Osaka (JP); Kazunari Yoshimura, Hirakata (JP); Kuninori Nakamura, Owariasahi (JP)

(73) Assignee: Matsushita Electric Works, Ltd., Kadoma (JP)

(*) Notice: Subject to any disclaimer, the term of this patent is extended or adjusted under 35 U.S.C. 154(b) by 0 days.

(21) Appl. No.: 10/446,779

(22) Filed: May 29, 2003

(30) Foreign Application Priority Data

Jun. 10, 2002 (JP) ........................................ 2002-168871

(51) Int. Cl.[7] ................................................ G01C 3/08
(52) U.S. Cl. ..................................................... 356/5.01
(58) Field of Search ...................... 356/4.01, 5.01–5.15; 342/118–146

(56) References Cited

U.S. PATENT DOCUMENTS

| | | | |
|---|---|---|---|
| 3,914,052 A | * 10/1975 | Wiklund | ..................... 356/5.13 |
| 4,533,242 A | * 8/1985 | McLauchlan et al. | ...... 356/5.07 |
| 5,054,911 A | 10/1991 | Ohishi et al. | |
| 6,587,073 B2 | * 7/2003 | Schiek et al. | ............... 342/124 |

FOREIGN PATENT DOCUMENTS

JP 2001-124855 5/2001

* cited by examiner

Primary Examiner—Bernarr E. Gregory
Assistant Examiner—Brian Andrea
(74) Attorney, Agent, or Firm—Oblon, Spivak, McClelland, Maier & Neustadt, P.C.

(57) ABSTRACT

Distance measuring apparatus and method using a pulsed electromagnetic wave for making a high speed precise distance measurement between the apparatus and an object over a small distance. The electromagnetic wave is projected to an object from a single projector to provide a reflected electromagnetic wave from the object that is received by a single receiver also receiving a reference electromagnetic wave branched from the projected electromagnetic wave. The reference-wave reception time at the receiver is delayed by a delay time, so that a first time period between the electromagnetic wave projection time and the reference-wave reception time is longer than a second time period between the projection time and a reflection-wave reception time at the receiver. The distance is determined according to the delay time and the time difference between the reference-wave reception time and the reflection-wave reception time.

14 Claims, 16 Drawing Sheets

DISTANCE MEASURING APPARATUS AND METHOD USING A PULSED ELECTROMAGNETIC WAVE

BACKGROUND OF THE INVENTION

1. Field of the Invention

The present invention relates to an improvement of measurement accuracy in the case of determining a distance from an object according to a Time of Flight Method, and particularly to a distance measuring apparatus and method using a pulsed electromagnetic wave, by which a precise distance measurement can be performed with a high-speed response even when the distance is small.

2. Disclosure of the Prior Art

A method of determining a distance from an object according to a time period between a projection time, at which a pulsed electromagnetic wave is projected to the object, and a reflection-wave reception time, at which the electromagnetic wave reflected from the object is received is known as a Time of Flight Method.

For example, U.S. Pat. No. 5,054,911 discloses a light wave distance measuring instrument of the pulse type. According to this instrument, a part of the light wave projected to an object is used as a reference light wave, and allowed to pass alone an optical path having a predetermined length without interacting with the object. A reflection wave obtained when the light wave is reflected off the object and the reference wave are received by a single receiver. A distance between the object and the instrument is determined according to a time difference between a reference-wave reception time, at which the reference wave is received by the receiver, and a reflection-wave reception time, at which the reflection wave is received by the same receiver.

By the way, as shown in FIG. 24, when the distance between the instrument and the object is small, the reference wave "S" may be positioned closely adjacent to the reflection wave "R" on the time axis. In this case, it becomes difficult to clearly separate the reference wave "S" and the reflection wave "R" from each other, so that there is a problem in that the measurement accuracy is lowered. To avoid such a problem, it was proposed to introduce an optical fiber having a predetermined length into an optical path for the reflection wave, and delay the reception of the reflection-wave by a delay time "Td" such that the reflection wave "R" is spaced away from the reference wave "S" on the time axis, as shown by the dotted line in FIG. 24. Thereby, the distance can be determined according to a time difference "TS-R" between the receptions of the reflection wave and the reference wave and the delay time "Td."

However, the reflectivity of the object changes according to the color of the object surface, i.e., whether the surface color is black or white. In addition, the reflectivity changes according to the surface condition of the object, i.e., whether the object surface is a mirror reflection surface or a diffuse reflection surface. Therefore, when the reflectivity is small, there is a concern that a considerable loss of light can result from allowing the reflection wave to pass through the optical fiber. Needless to say, as the length of the optical fiber increases, the problem of light loss becomes more serious. In other words, it reduces the S/N ratio. For example, to prevent this S/N ratio deterioration, the gain of an amplifier or an amount of the light wave projected to the object can be increased. However, these solutions to the S/N deterioration problem lead to an increase in cost of the distance measuring instrument. In addition, there is another problem in that the distance measuring instrument becomes a huge and complex structure.

SUMMARY OF THE INVENTION

Therefore, in consideration of the above, a primary object of the present invention is to provide a distance measuring apparatus using a pulsed electromagnetic wave, by which a precise distance measurement can be performed with a high-speed response even when a distance between the apparatus and an object is small.

That is, the distance measuring apparatus includes:

a single projector for projecting the electromagnetic wave to an object;

a branch means placed between the projector and the object to obtain a reference wave branched from the electromagnetic wave;

a single receiver for receiving the reference wave and a reflection wave obtained when the electromagnetic wave is reflected off the object;

a delay means introduced into an optical path for the reference wave extending from the branch means to the receiver without interacting with the object to provide a delay time for delaying a reference-wave reception time, at which the reference wave is received by the receiver, such that a first time period between the reference-wave reception time and an electromagnetic-wave projection time, at which the electromagnetic wave is projected from the projector, is longer than a second time period between the projection time and a reflection-wave reception time, at which the reflection wave is received by the receiver; and a processor for calculating a time difference between the reference-wave reception time and the reflection-wave reception time from outputs of the receiver, and determining a distance between the distance measuring apparatus and the object according to the time difference and the delay time.

According to the distance measuring apparatus of the present invention, since the reference-wave reception time is delayed than the reflection-wave reception time by the delay time, it is possible to prevent the occurrence of an inconvenience that the reference wave is overlapped with the reflection wave, as shown in FIG. 24, so that the distance can not be measured with accuracy. In particular, since maintaining a high strength of the reference wave is relatively easy, a light loss of the reference wave caused by allowing the reference wave to pass through the delay means such as an optical fiber to delay the reference wave reception time does not wield a large influence over the accuracy of measuring the distance.

When the electromagnetic wave is light, it is preferred that the delay means is provided by an optical fiber having a predetermined length or a plurality of mirrors arranged so as to prolong the optical path for the reference wave. In the case of using the optical fiber, it is possible to obtain a desired delay time according to the length of the optical fiber. In the case of using the mirrors, it is possible to stably provide the delay time even in the presence of disturbance factors such as changes in ambient temperature In addition, it is preferred that the delay means includes a reference-wave receiving device used only to receive the reference wave from the branch means; a delay circuit for delaying an output signal provided from the reference-wave receiving device; and a reference-wave emitting device for providing an output of the delay circuit to the receiver. This embodiment is effective to downsize the distance measuring apparatus of the present invention.

It is preferred that the delay means includes a delay-time adjuster for changing the delay time. In this case, since an adequate delay time can be selected in accordance with the distance to be measured, it is possible to accurately determine the distance with an improved response speed.

It is also preferred that the distance measuring apparatus further includes a temperature compensating unit for compensating for fluctuations of the delay time, which is caused by changes in ambient temperature. In this case, it is possible to stably maintain the measurement accuracy without the influence of ambient temperature.

When the electromagnetic wave is light, it is preferred that the distance measuring apparatus further includes a light-amount adjuster for adjusting a light amount of at least one of the reflection wave and the reference wave received by the receiver. Since adjusting the light amount of the reflection wave and/or the reference wave is effective to reduce noise components, it is possible to improve the S/N ratio and to more accurately determine the distance.

It is preferred that the processor allows the projector to make a plurality of projections of the electromagnetic wave to the object, and calculates an average time difference between the reference-wave reception time and the reflection-wave reception time from the outputs of the receiver provided for each of the plurality of projections of the electromagnetic wave to determine the distance according to the average time difference and the delay time. This embodiment is particularly useful when it is needed to determine the distance with high accuracy. In addition, this embodiment is preferably used when a preliminary measurement of roughly determining the distance is performed by using a provisionally-determined delay time, and then the delay time used in an actual measurement of precisely measuring the distance is adjusted according to results of the preliminary measurement.

It is preferred that the delay means provides the delay time longer than a time period required to allow the electromagnetic wave to pass through double a maximum measurable distance of the distance measuring apparatus. When the distance to be measured is smaller than the maximum measurable distance, it is possible to certainly separate the reflection wave from the reference wave.

A further object of the present invention is to provide a distance measuring method using a pulsed electromagnetic wave, by which the same advantages described above can be achieved. That is method comprises the steps of:

projecting the electromagnetic wave to an object from a single projector;

receiving, by a receiver, a reflection wave obtained when the electromagnetic wave is reflected off the object;

receiving, by the same receiver, a reference wave branched from the electromagnetic wave before the electromagnetic wave reaches the object; and determining a distance from the object according to outputs of the receiver;

wherein the method is characterized in that a reference-wave reception time, at which the reference wave is received by the receiver, is delayed by a delay time, so that a first time period between an electromagnetic-wave projection time, at which the electromagnetic wave is emitted from the projector, and the reference-wave reception time is longer than a second time period between the projection time and a reflection-wave reception time, at which the reflection wave is received by the receiver, and the distance from the object is determined according to the delay time and a time difference between the reference-wave reception time and the reflection-wave reception time.

In the above method, it is preferred that the delay time is changed according to a large or small distance from the object. By selecting an adequate delay time, it is possible to efficiently perform the distance measurement.

In addition, it is preferred that a preliminary measurement of roughly determining the distance from the object is performed by using a provisionally-determined delay time, and then the delay time used in an actual measurement of precisely measuring the distance is adjusted according to results of the preliminary measurement. Since the results of the preliminary measurement are useful to select the adequate delay time, it is possible to smoothly proceed the actual measurement with high accuracy. In particular, when the electromagnetic wave is projected to the object plural times in the actual measurement, and an average time difference between the reference-wave reception time and the reflection-wave reception time is calculated from the outputs of the receiver provided every projection of the electromagnetic wave, so that the distance is determined according to the average time difference and the delay time, it is recommend performing the preliminary measurement.

Moreover, it is preferred that a preliminary measurement of roughly determining the distance from the object is performed by using a provisionally-determined delay time, and then a light amount of at least one of the reflection wave and the reference wave received by the receiver in an actual measurement of precisely measuring the distance is adjusted according to results of the preliminary measurement. By selecting the adequate light amount of the reflection wave and/or the reference wave, it is possible to determine the distance with an improved SIN ratio.

These and still other objects and advantages of the present invention will become more apparent from preferred embodiments of the invention explained below, referring to the attached drawings.

BRIEF EXPLANATION OF THE ATTACHED DRAWINGS

DETAIL DESCRIPTION OF THE PREFERRED EMBODIMENTS OF THE INVENTION

According to the following preferred embodiments, distance measuring apparatus and method of the present invention are explained in detail. However, needless to say, the present invention is not limited to these embodiments.

Figure 1:
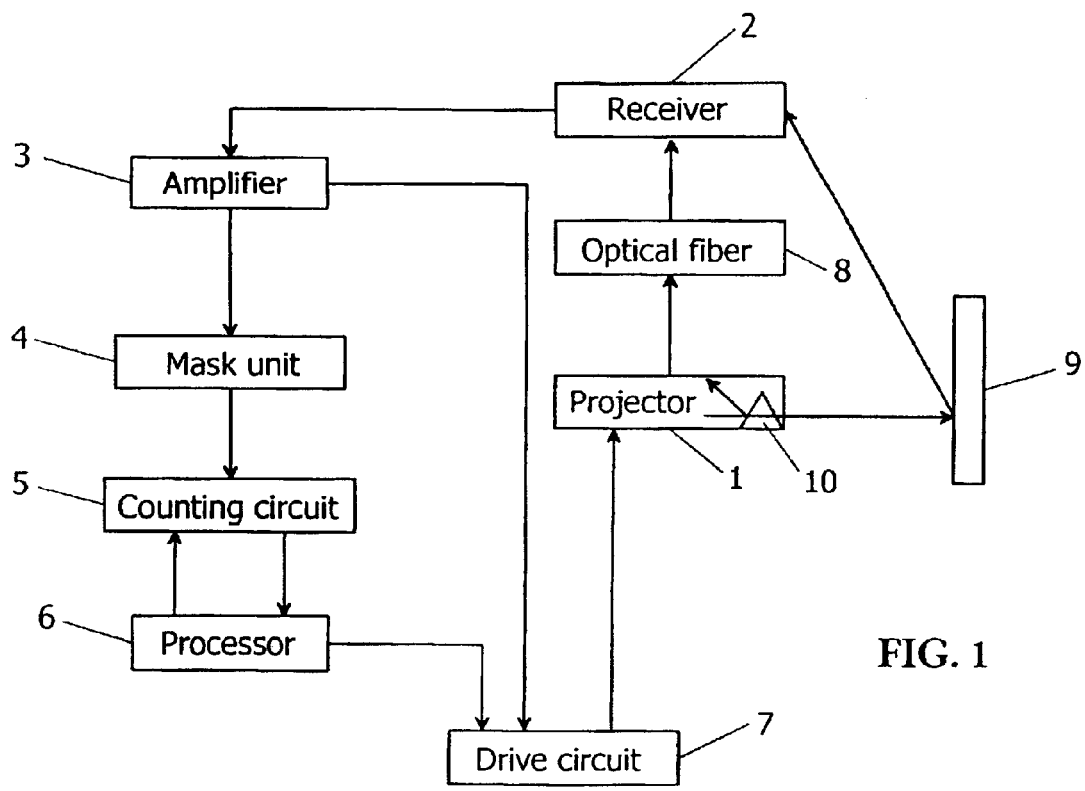
FIG. 1 is a block diagram of a distance measuring apparatus according to a preferred embodiment of the present invention.

FIG. 1 shows a distance measuring apparatus of this embodiment. The numeral 1 designates a projector such as a semiconductor laser for emitting a pulsed laser light according to an output of a drive circuit 7. A part of the emitted laser light is branched off as a reference wave by branch means such as a beam splitter 10, and the balance passes through the beam splitter. The laser light passed through the beam splitter 10 is reflected by an object 9 to provide a reflection wave. The reflection wave is received by a receiver 2 such as a photodiode through a lens (not shown). On the other hand, the reference wave is received by the same receiver 2 through an optical fiber 8 used as delay means explained later. Thus, the reference and reflection waves are obtained from the pulsed laser light provided by the single projector 1, and received at different timings by the single receiver 2.

An amplifier 3 amplifies outputs of the receiver 2. The amplified outputs are then sent to a mask unit 4 for selectively generating a reference-wave separation mask and a reflection-wave separation mask. When the mask unit 4 generates the reference-wave separation mask, only signal components corresponding to the reference wave can pass through the reference-wave separation mask. On the contrary, when the masking unit 4 generates the reflection-wave separation mask, only signal components corresponding to the reflection wave can pass through the reflection-wave separation mask. The generations of the reference-wave separation mask and the reflection-wave separation mask can be switched by use of an analog switch or a gate circuit.

Outputs of the mask unit 4 are input in a counting circuit 5. The counting circuit 5 has a clock function. That is, the counting circuit 5 measures, within a period of generating the reference-wave separation mask, a first time period (T1) between an laser projection time, at which the laser light is projected from the projector 1, and a reference-wave reception time, at which the reference wave is received by the receiver 2, and within a period of generating the reflection-wave separation mask, a second time period (T2) between the laser projection time and a reflection-wave reception time, at which the reflection wave is received by the receiver 2. The selection between the reference-wave separation mask and the reflection-wave separation mask can be controlled by the counting circuit S.

Figure 2A:
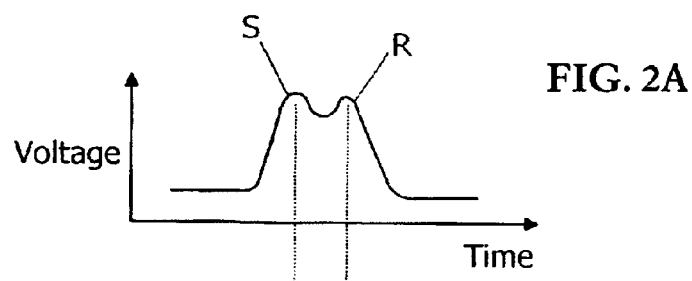
FIGS. 2A and 2B show schematic diagrams illustrating the principal of a distance measuring method of the present invention.
Figure 2B:
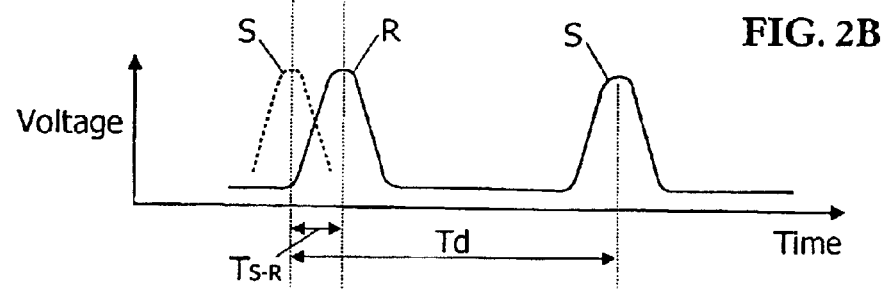

By the way, when the distance between the apparatus and the object 9 is small, a reference pulse wave S is positioned closely adjacent to a reflection pulse wave R on the time axis, as shown in FIG. 2A. Therefore, it is difficult to separate the reflection pulse wave S and the reference pulse wave R from each other. In this embodiment, an optical fiber 8 is introduced into an optical path for the reference wave extending from the beam splitter 10 to the receiver 2 without through the object 9. Since the optical fiber 8 has a length sufficiently larger than the distance between the apparatus and the object 9, the reference-wave reception time is delayed than the reflection-wave reception time. Thus, the optical fiber 8 functions as the delay means for providing a delay time (Td) for delaying the reference-wave reception time, as shown in FIG. 2B, such that the first time period (T1) between the reference-wave reception time and the laser-light projection time is longer than the second time period (T2) between the laser-light projection time and the reflection-wave reception time. By introducing the optical fiber 8 as the delay means, it is possible to prevent a situation that the reflection pulse wave R is overlapped with the reference pulse wave S, and therefore accurately determine the distance even when the distance between the apparatus and the object is relatively small.

The first time period (T1) is equal to a sum of a time component (Ts) such as a response time of the receiver 2 and the above-described delay time (Td), i.e., Ts+Td. The second time period (T2) is equal to a sum of the time component (Ts) and a time component (TL) that changes in accordance with the distance between the apparatus and the object 9, i.e., Ts+TL. As understood from these, a difference between the reflection-wave reception time and the reference-wave reception time (T1−T2) is equal to "Td−TL". Therefore, the time component TL can be determined by "Td−(T1−T2)".

To provide an even greater improvement in measurement accuracy, it is preferred that the above procedures for measuring the first and second time periods are repeated a specified number of times (N). For example, when the specified number of times (N) equals 10000, the measurement of each of the first and second time periods is performed 10000 times, so that a first accumulated time (S1) corresponding to a total of the first time periods measured 10000 times and a second accumulated time (S2) corresponding to a total of the second time periods measured 10000 times are obtained. The first and second accumulated times measured by the counting circuit 5 are sent to a processor 6. In the processor 6, the distance between the apparatus and the object 9 is determined according to the first and second accumulated times (S1, S2), the specified number of times (N), and the delay time (Td). That is, the distance can be accurately determined according to the delay time (Td) and an average time difference between the reference-wave reception time and the reflection-wave reception time, which is obtained by calculating (S1−S2)/N.

Figure 3:
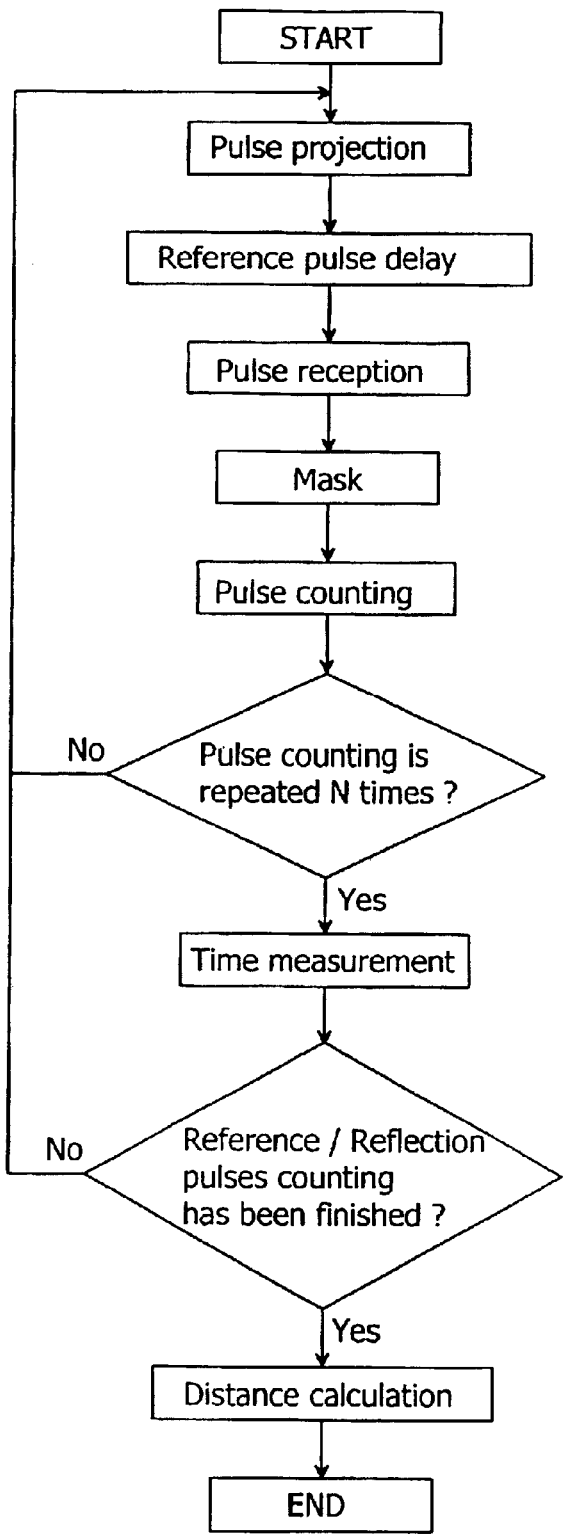
FIG. 3 is a flow chart of the distance measuring method.

FIG. 3 is a schematic flowchart of the above-explained distance measuring method. Mask unit 4, counting circuit 5, processor 6, and a drive circuit 7 for controlling the emission timing of a pulsed laser light from a projector 2, which were disclosed in Japan Patent Application No. 2001-124855 A, can be used for the distance measuring apparatus of the present invention.

By the way, when the optical fiber 8 having a fixed length is used as the delay means, and the distance between the apparatus and the object 9 is nearly equal to the fixed length of the optical fiber, there is a fear that the reference pulse wave is overlapped with the reflection pulse wave on the time axis. In such a case, it is preferred that the entire length of the optical fiber 8 is larger than double a maximum measurable distance of the distance measuring apparatus. In other words, it is preferred that the entire length of the optical fiber 8 is determined to provide the delay time longer than a time period required to allow the laser light to pass through double the maximum measurable distance of the distance measuring apparatus On the other hand, when the maximum measurable distance is relatively long, an extended length of the optical fiber 8 may lead to an increase in size of the distance measuring apparatus. In such a case, it is preferred to use a switching mechanism for the delay means of removing the optical fiber 8 from the light path when the reference pulse wave is overlapped with the reflection pulse wave, or another delay means having a delay time adjuster described later.

In the case of using the optical fiber 8 as the delay means, it is preferred to use an optical fiber of an optical material having an extremely small thermal expansion coefficient such as quartz. It is possible to minimize the influence of ambient temperature. In addition, as the optical fiber, "SI" type and "GI" type are mainly known. In the present invention, it is preferred to use the "GI" type optical fiber to accurately set the delay time.

Figure 4A:
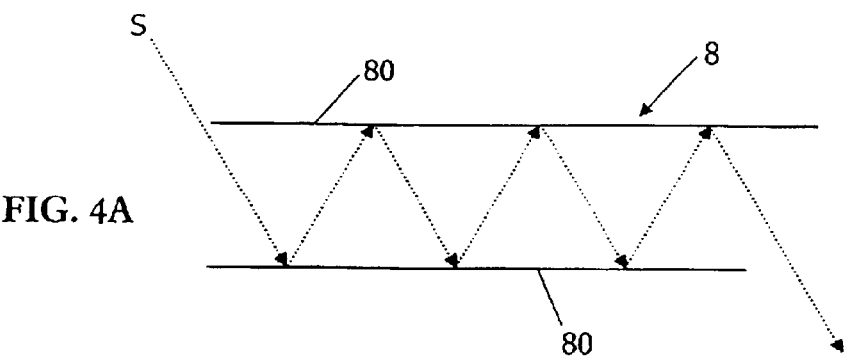
FIGS. 4A and 4B are explanatory diagrams illustrating examples of delay means.
Figure 4B:
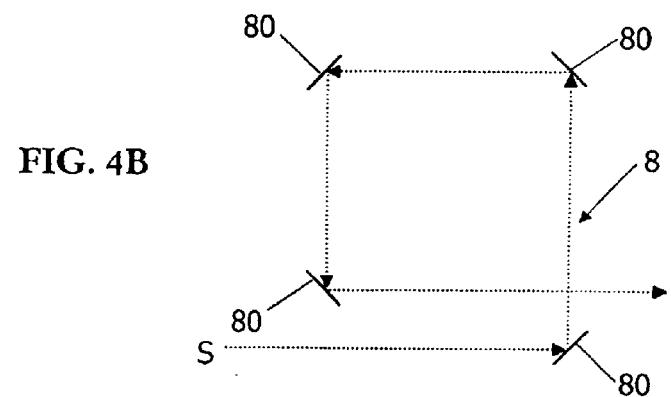
Figure 5:
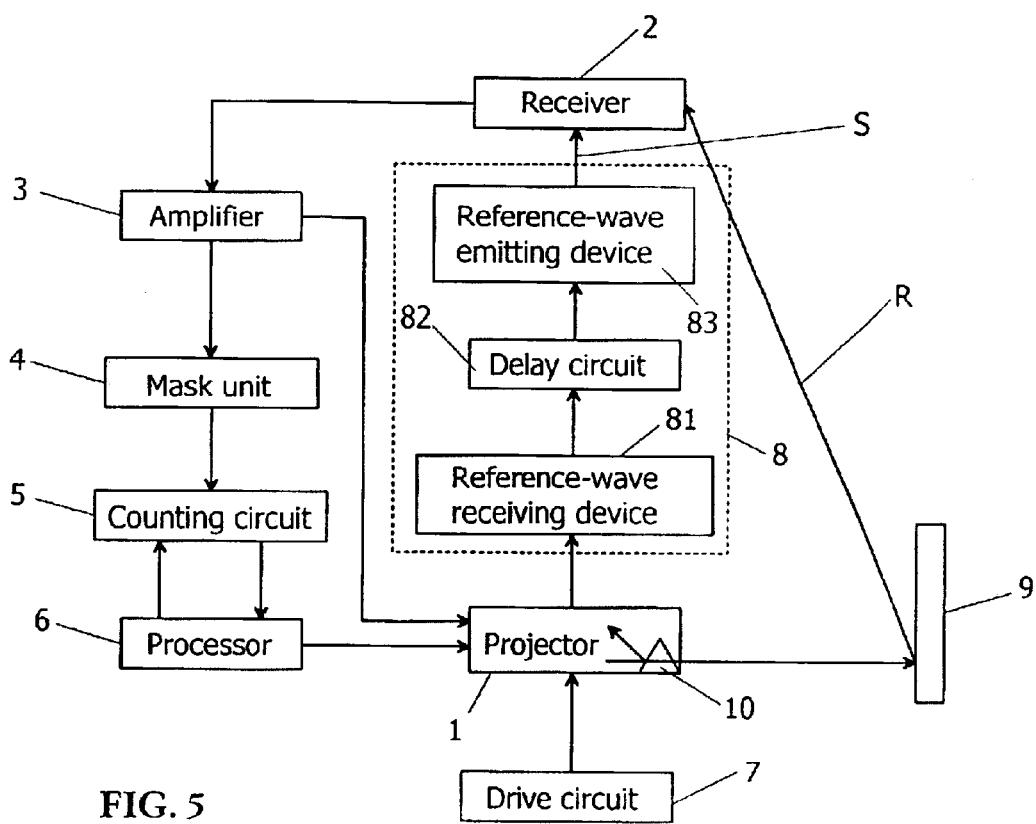
FIG. 5 is a block diagram of a distance measuring apparatus with electrical delay means according to another embodiment of the present invention.

Alternatively, as the delay means 8, it is possible to use a plurality of mirrors 80 arranged so as to prolong the optical path for the reference wave, or a waveguide, as shown in FIGS. 4A and 4B. In addition, as shown in FIG. 5, it is preferred that the delay means is an electrical delay unit comprising a reference-wave receiving device 81 used only to receive the reference wave from the beam splitter 10, a delay circuit 82 for delaying an output signal provided from the reference-wave receiving device by a required time period; and a reference-wave emitting device 83 for providing an output of the delay circuit to the receiver 2.

Figure 6:
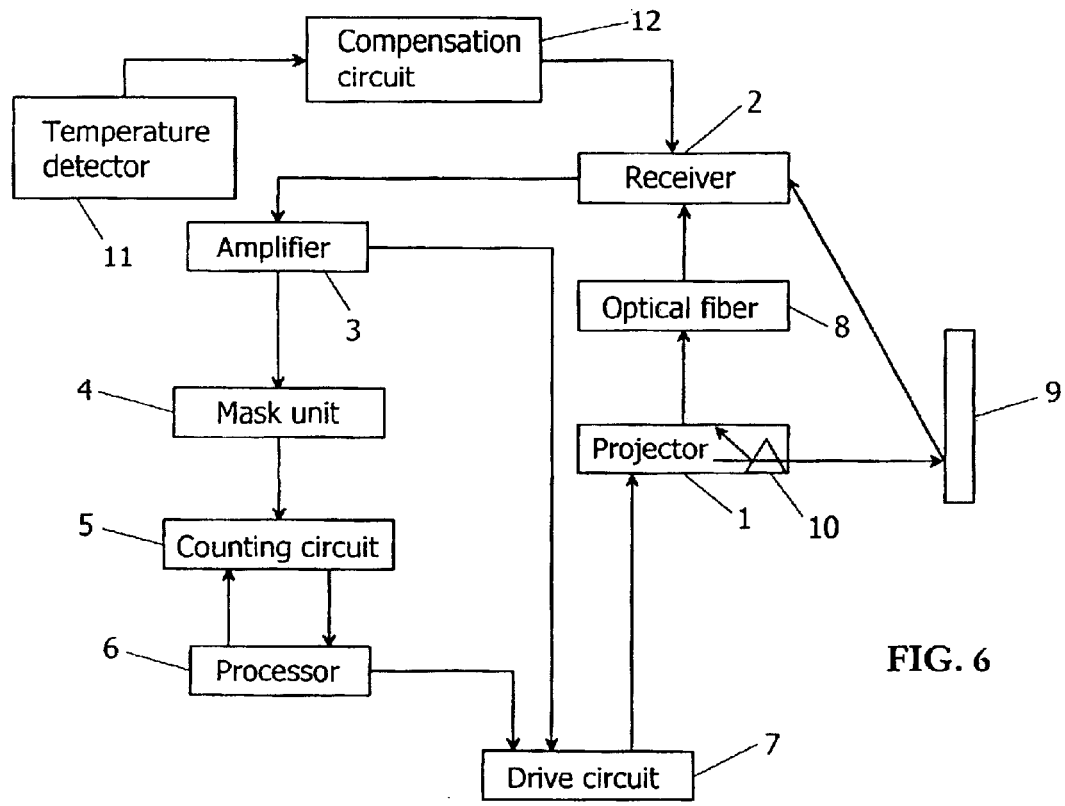
FIG. 6 is a block diagram of a distance measuring apparatus with a temperature compensating unit according to another embodiment of the present invention.

When the optical fiber 8 is used as the delay means, the length of the optical fiber fluctuates in accordance with thermal expansion and constriction of the optical fiber caused by changes in ambient temperature, so that there is a fear that a change in the delay time (Td) has an influence on the measurement accuracy. In such a case, as shown in FIG. 6, it is preferred to use a compensation circuit 12 for compensating for the delay time (Td) according to the temperature value detected by a temperature detector 11. The influence of ambient temperature can be compensated in a real-time manner.

Figure 7:
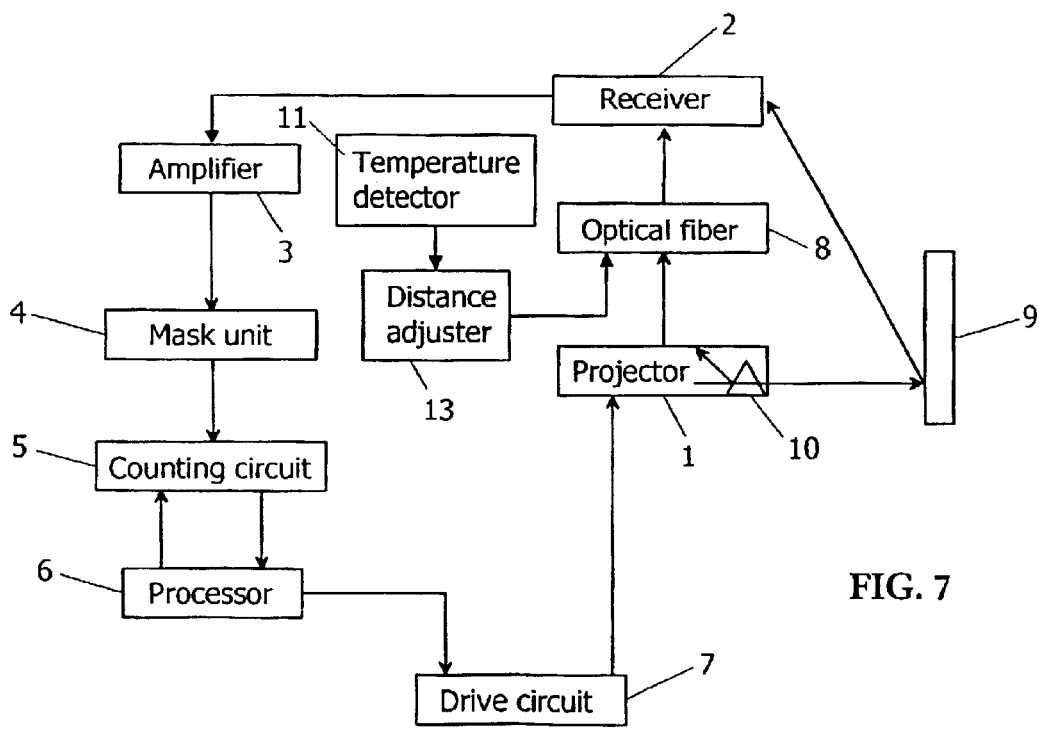
FIG. 7 is a block diagram of a distance measuring apparatus according to another embodiment of the present invention.
Figure 8:
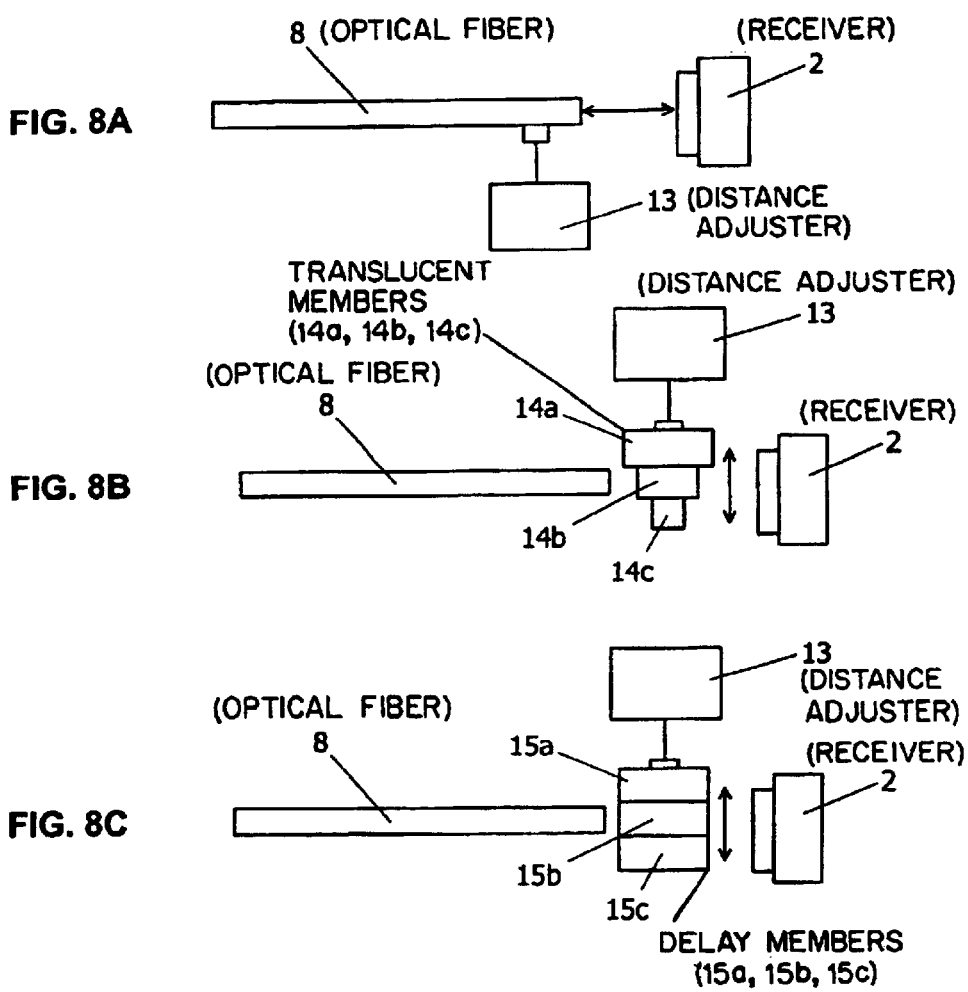
FIGS. 8A to 8C are explanatory diagrams illustrating examples of the temperature compensating unit.

For example, as shown in FIGS. 7 and 8A, a change in length of the optical fiber 8 caused by the thermal expansion and constriction can be also compensated by use of a distance adjuster 13 of controlling a distance between an end of the optical fiber 8 and the receiver 2 in accordance with the temperature value detected by the temperature detector 11. Alternatively, as shown in FIG. 8B, the change in length of the optical fiber 8 caused by the thermal expansion and constriction may be compensated by inserting a required one of translucent members (e.g., 14a, 14b, 14c) having different lengths in a space between the end of the optical fiber 8 and the receiver 2 in accordance with the temperature value detected by the temperature detector 11. In addition, as shown in FIG. 8C, the change in length of the optical fiber 8 caused by the thermal expansion and constriction may be compensated by inserting a required one of delay members (e.g., 15a, 15b, 15c) having different refraction indexes in the space between the end of the optical fiber 8 and the receiver 2 in accordance with the temperature value detected by the temperature detector 11. When the reference-wave reception time is electrically delayed, as explained above with reference to FIG. 5, it is preferred to fine adjust the delay time in accordance with the detected temperature value.

It is also effective to provide a temperature compensation unit for the photodiode used as the receiver 2. For example, in an embodiment shown in FIG. 9, a temperature detector (i.e., temperature sensor 11) detects the ambient temperature to output an analog data. This analog data is sent to a microcomputer (i.e., controller) through an A/D converter. A compensation voltage value output from the microcomputer is converted again into an analog data by a D/A converter, and then applied to a compensation power supply. The compensation power supply changes a voltage value for the photodiode in accordance with the applied voltage value.

By the way, when the projection of the pulsed electromagnetic wave is repeated a specific number of times (N), the reception of the reflection wave R from the object 9 and the reception of the reference wave S are also repeated the specific number of times (N) under a condition that a relatively long delay time is set. Thus, there is a danger that the total time required to determine the distance between the apparatus and the object becomes long. In such a case, it is preferred that the delay means 8 has a delay-time adjuster for changing the delay time (Td), and as shown in FIG. 10, a preliminary measurement is performed for roughly determining the distance between the apparatus and the object by using a provisionally-determined delay used in an actual measurement of precisely measuring the the delay-tine adjuster according to results of the preliminary measurement.

It is preferred that the delay time used in the preliminary measurement is longer than a time period required to allow the laser-light to pass through double the maximum measurable distance of the distance measuring apparatus. Thereby, in most cases, the delay time for the actual measurement becomes shorter than the delay time for the preliminary measurement. As a result, it is possible to more efficiently determine the distance while maintaining the measurement accuracy, as compared with the case of determining the distance by use of the relatively long delay time without the preliminary measurement.

Figure 10:
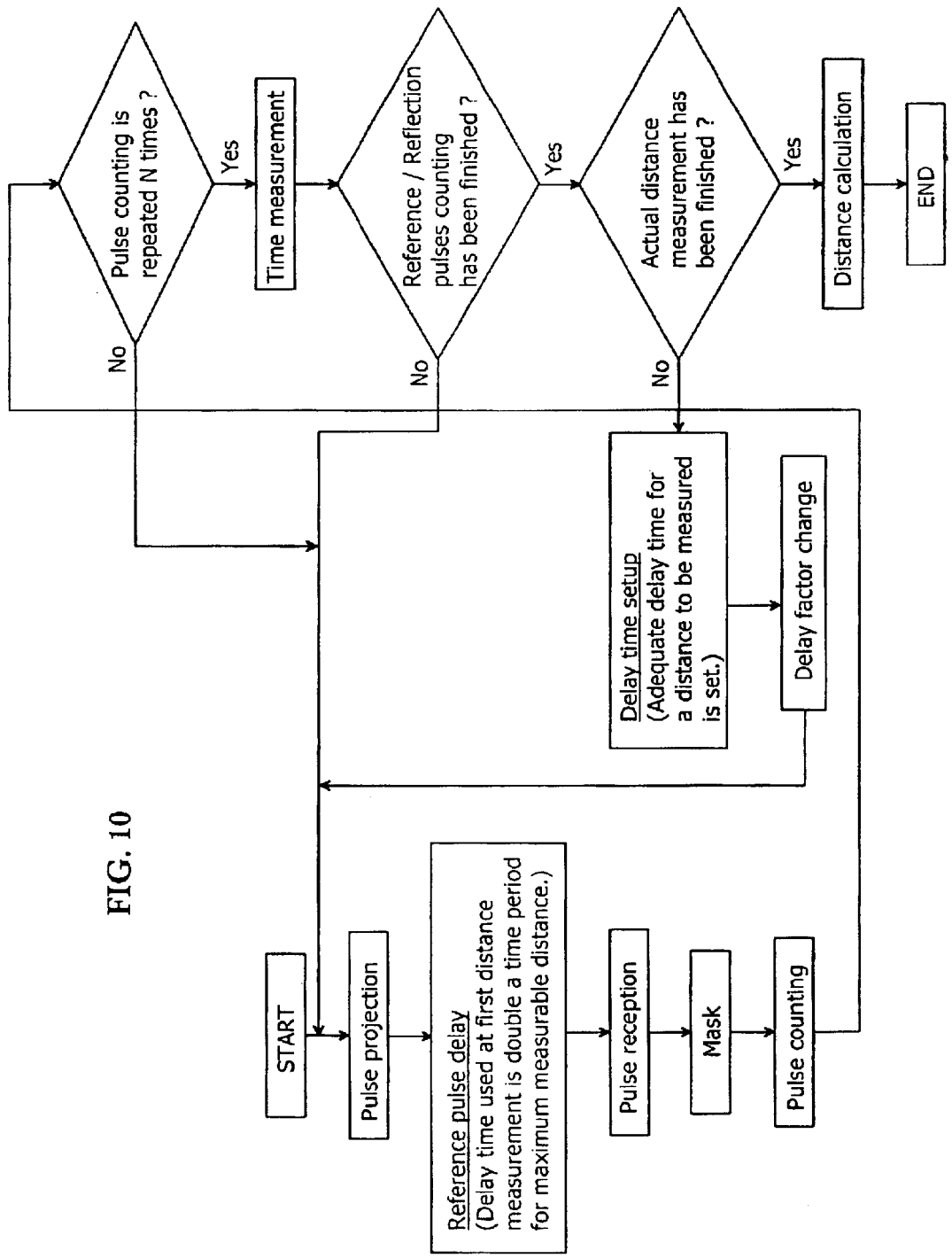
FIG. 10 is a flow chart of a distance measuring method according to a further preferred embodiment of the present invention.

In FIG. 10, the series of procedures of the projection of the pulsed electromagnetic wave, the reception of the reflection wave R, and the reception of the reference wave S are repeated the specific number of times (N) in both of the preliminary measurement and actual measurement. In this case, it is preferred that the specific number of times (Np) in the preliminary measurement is smaller than the specific number of times (Na) in the actual measurement to reduce the total time required to determine the distance. Alternatively, the series of procedures described above may be repeated only in the actual measurement.

When a repetition timing of projecting the pulsed electromagnetic wave from the projector 1 is constant, the total time required for determining the distance can not be reduced by changing the length of the delay time. In such a case, it is preferred that the signal components corresponding to the reference wave, which output from the reference wave separation mask of the mask unit 4, or the signal components corresponding to the reflection wave, which output from the reflection-wave separation mask of the mask unit 4, are used for a trigger for providing the repetition timing of projecting of the pulsed electromagnetic wave. In addition, the trigger is not limited to the above. For example, the reception of the reference wave by the receiver 2 may be used as the trigger. In this case, when the series of procedures of the projection of the pulsed electromagnetic wave, the reception of the reflection wave R, and the reception of the reference wave S are repeated the specific number of times (N), each of the projections of the pulsed electromagnetic wave to the object 9 is performed immediately when the receiver 2 receives the reference wave derived from a previously projected electromagnetic wave. Alternatively, as the repetition timing, the pulsed electromagnetic wave may be projected after a lapse of a predetermined time period from the reception of the reference wave by the receiver 2.

Figure 9:
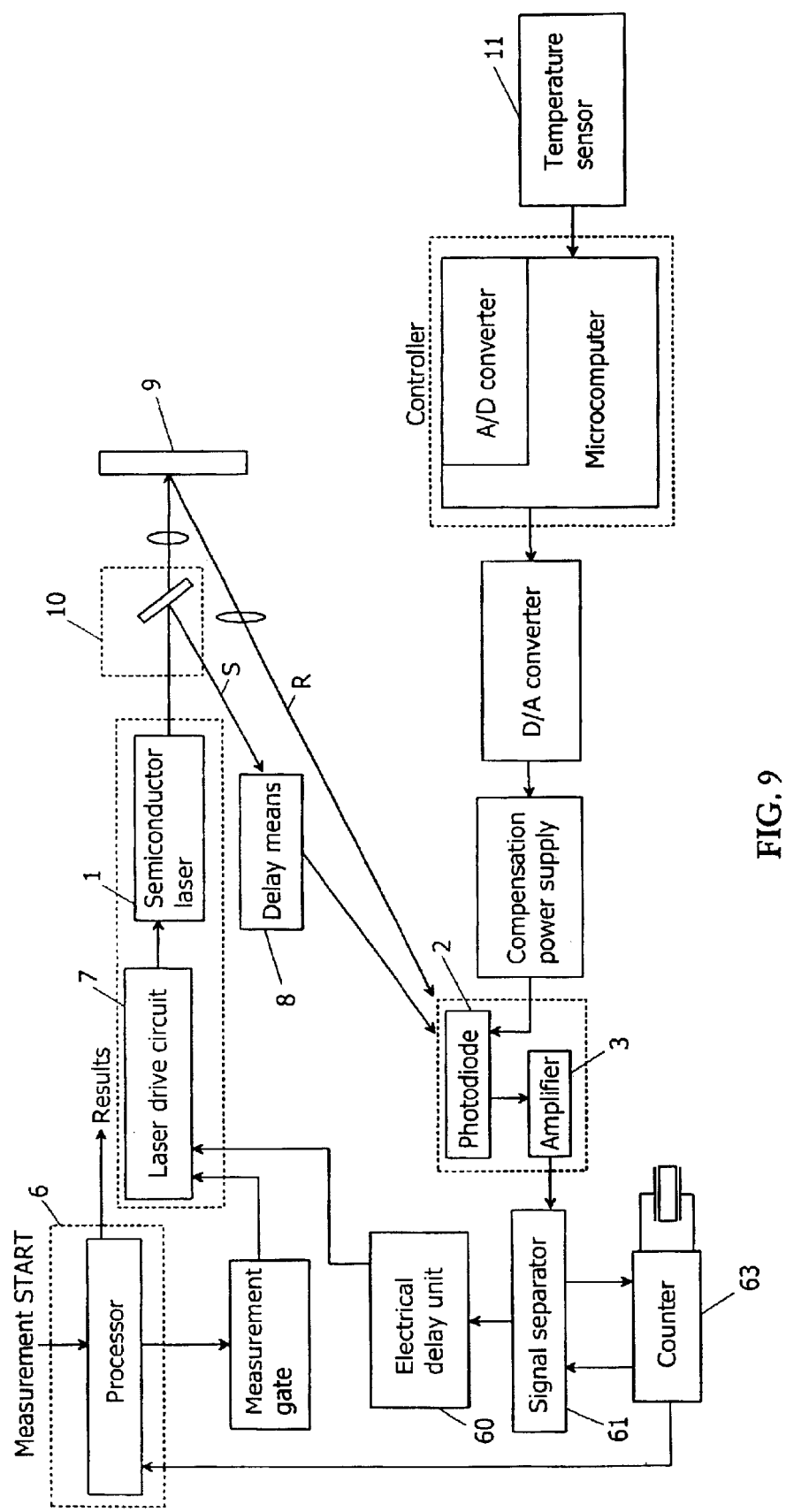
FIG. 9 is a block diagram of a distance measuring apparatus with another temperature compensating unit.

As an example, electrical delay unit 60 for providing the trigger is shown in FIG. 9. The delay unit 60 receives a reference-wave detection signal from a signal separator 61 for separating the reference wave and reflection wave received by the receiver 2 from each other, and then allows the projector 1 to project the pulse electromagnetic wave according to the passage of a predetermined time period from the reception of the reference-wave detection signal. In the figure, the numeral 63 designates a counter for counting the repetition number of times.

Figure 11:
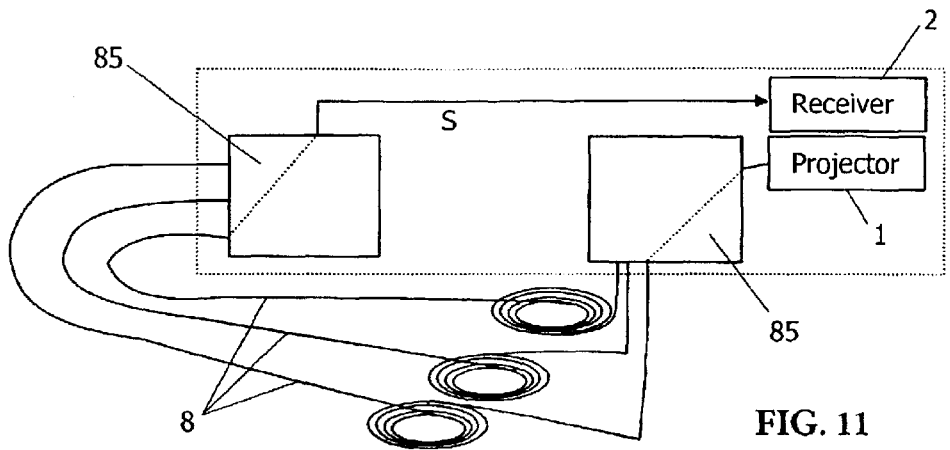
FIG. 11 is an explanatory diagram illustrating an example of a delay time adjuster.
Figure 12:
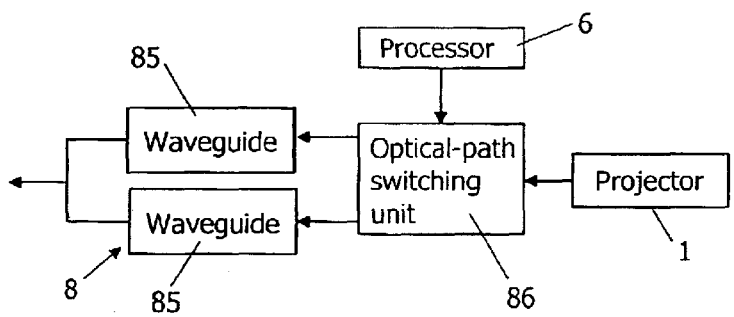
FIG. 12 is an explanatory diagram illustrating a further example of the delay time adjuster.
Figures 13A, 13B, 13C:
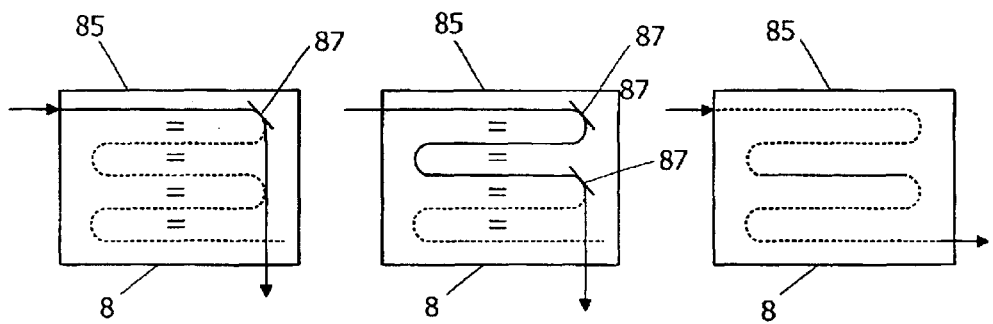
FIGS. 13A to 13C are explanatory diagrams illustrating another example of the delay time adjuster.

For example, as shown in FIG. 11, it is preferred that the delay means 8 has the capability of changing the delay time (Td), which is composed of a plurality of optical fibers having different lengths and a waveguide 85 as a splitter. In addition, as shown in FIG. 12, the delay means 8 having the capability of changing the delay time (Td) may be provided by an optical-path switching unit 86 such as an optical switch and a plurality of waveguides 85. Alternatively, as shown in FIGS. 13A to 13C, a waveguide 85 having built-in optical switches 87 may be used.

Figure 14:
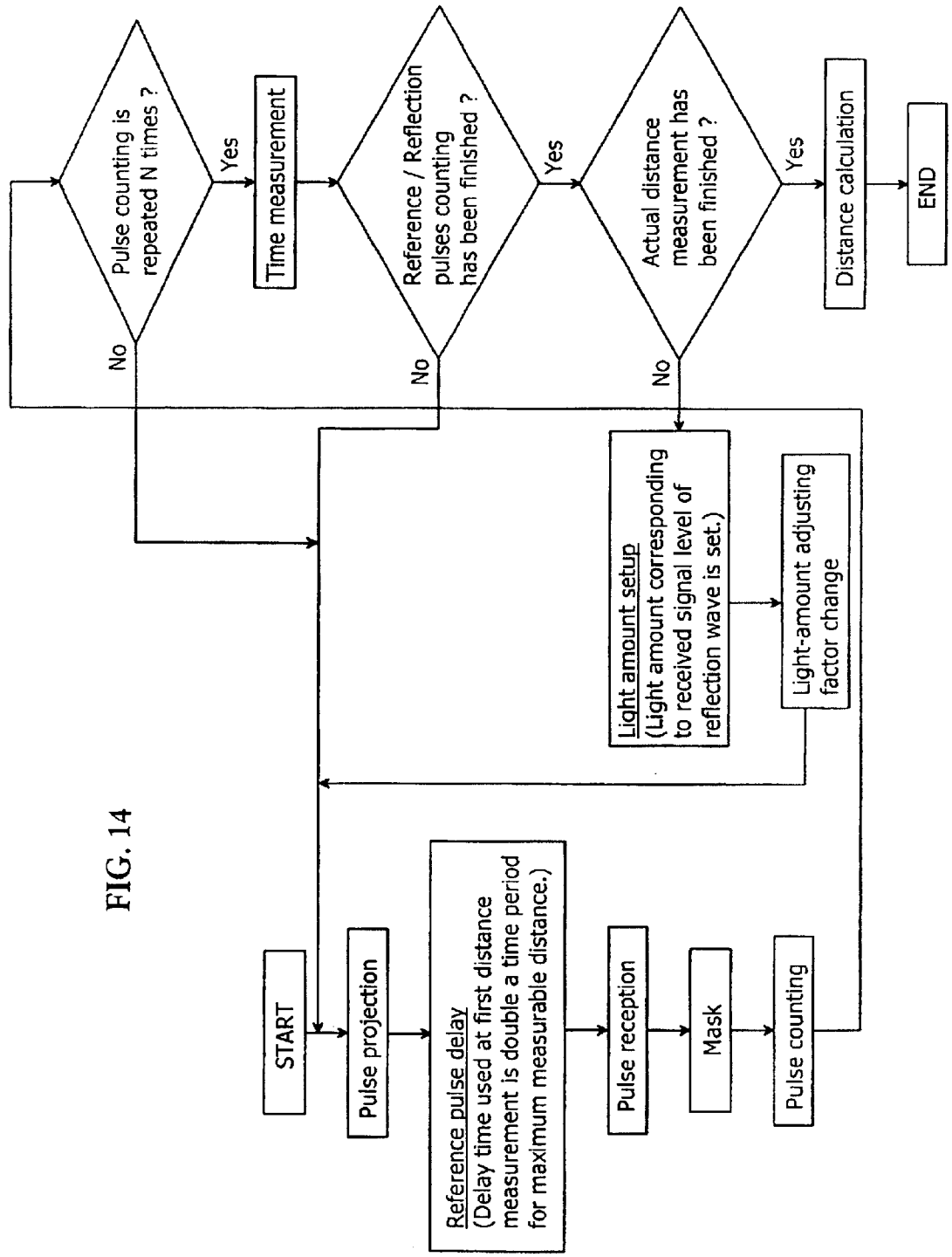
FIG. 14 is a flow chart of a distance measuring method according to another preferred embodiment of the present invention.

As shown in FIG. 14, it is preferred that a light-amount adjuster 90 for adjusting the light amount of the reference wave is formed, and the light amount of the reference wave is automatically adjusted by the light-amount adjuster 90 in accordance with a signal level of the received reflection wave in the preliminary measurement (or a distance between the apparatus and the object). In this case, since the signal level of the received reference wave is matched with the signal level of the received reflection wave in the actual measurement, it is possible to reduce the noise components generated around the reference pulse wave, and prevent recognizing the noise components as the reference wave by mistake. In addition, it is possible to more stably perform the distance measurement by matching the signal levels between the reference wave and the reflection wave.

Figure 15A:
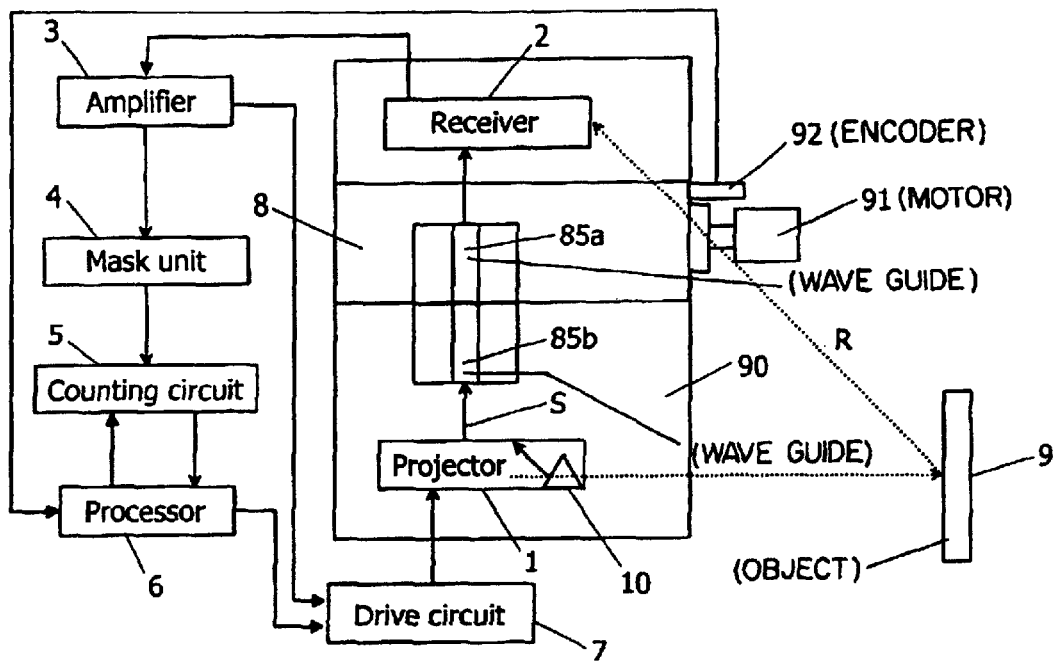
FIGS. 15A and 15B are explanatory diagrams illustrating an example of a light amount adjuster.
Figure 15B:
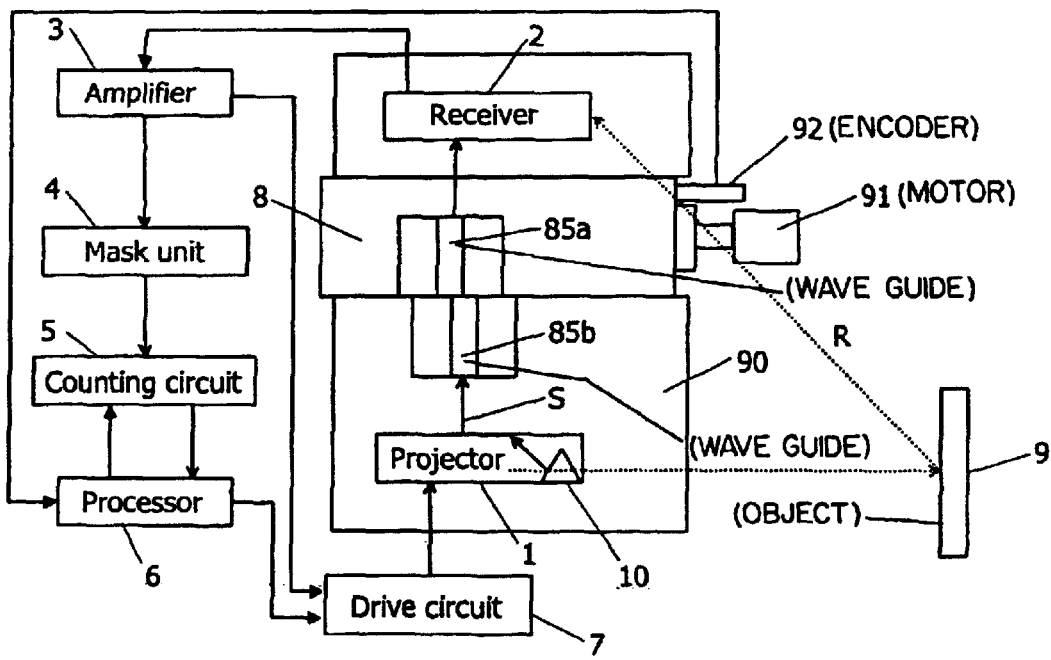

For example, as shown in FIGS. 15A and 15B, when a pair of waveguides 85a, 85b are placed as the delay means 8 in series in the optical path for the reference wave extending from the beam splitter 10 to the receiver 2, and a stage having the waveguide 85a is slidably moved against the stage having the waveguide 85b by a motor, 91, it is possible to adjust the light amount by changing a contact area between ends of the waveguides 85a and 85b. In the figure, the numeral 92 designates a high resolution encoder. A travel amount of the stage having the waveguide 85a moved by the motor 91 is controlled by the processor 6 and the drive circuit 7.

Figure 16:
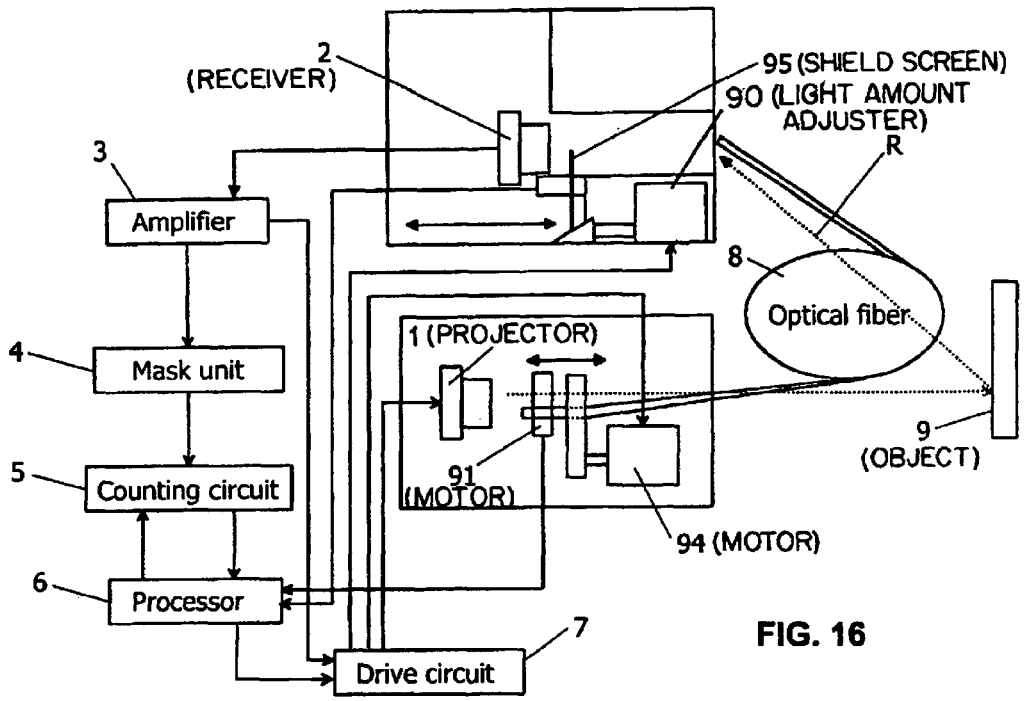
FIG. 16 is an explanatory diagram illustrating a further example of the light amount adjuster.
Figure 17:
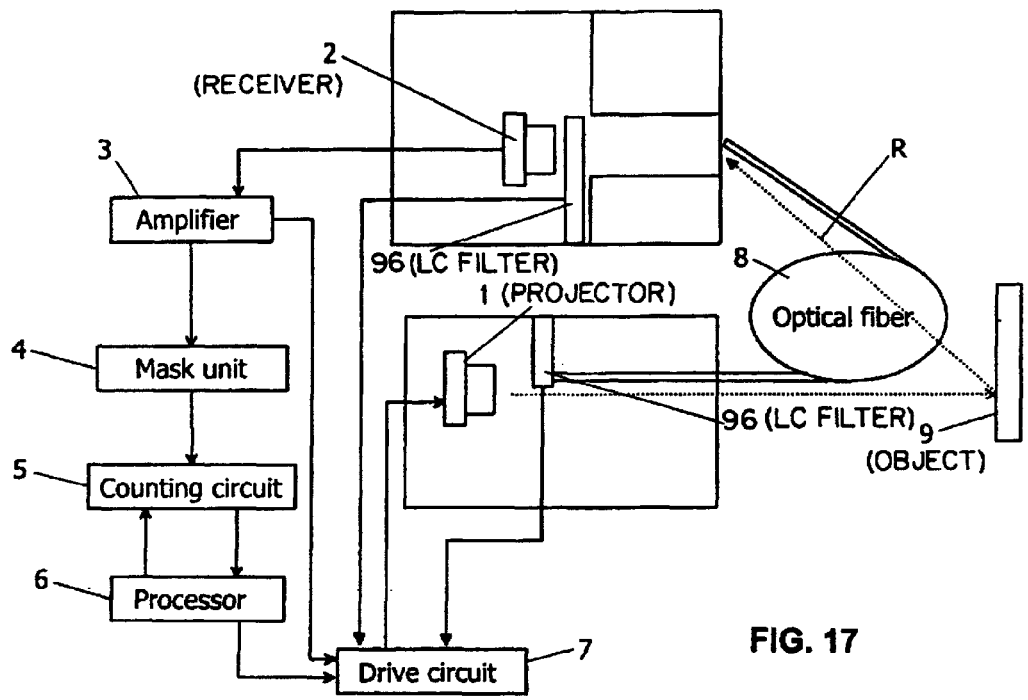
FIG. 17 is an explanatory diagram illustrating another example of the light amount adjuster.

In addition, according to the light amount adjuster 90 shown in FIG. 16, since a distance between the projector 1 and an end of the optical fiber 8 used as the delay means is adjusted by use of a motor 94, and a shield screen. 95, which is movable by use of a motor 91 to control the light amount received by the receiver 2, is placed in front of the receiver 2, it is possible to adjust a light amount of the reflection wave as well as the light amount of the reference wave. Alternatively, as shown in FIG. 17, a liquid 25 crystal filter 96 may be used as the light amount adjuster 90.

Figure 18:
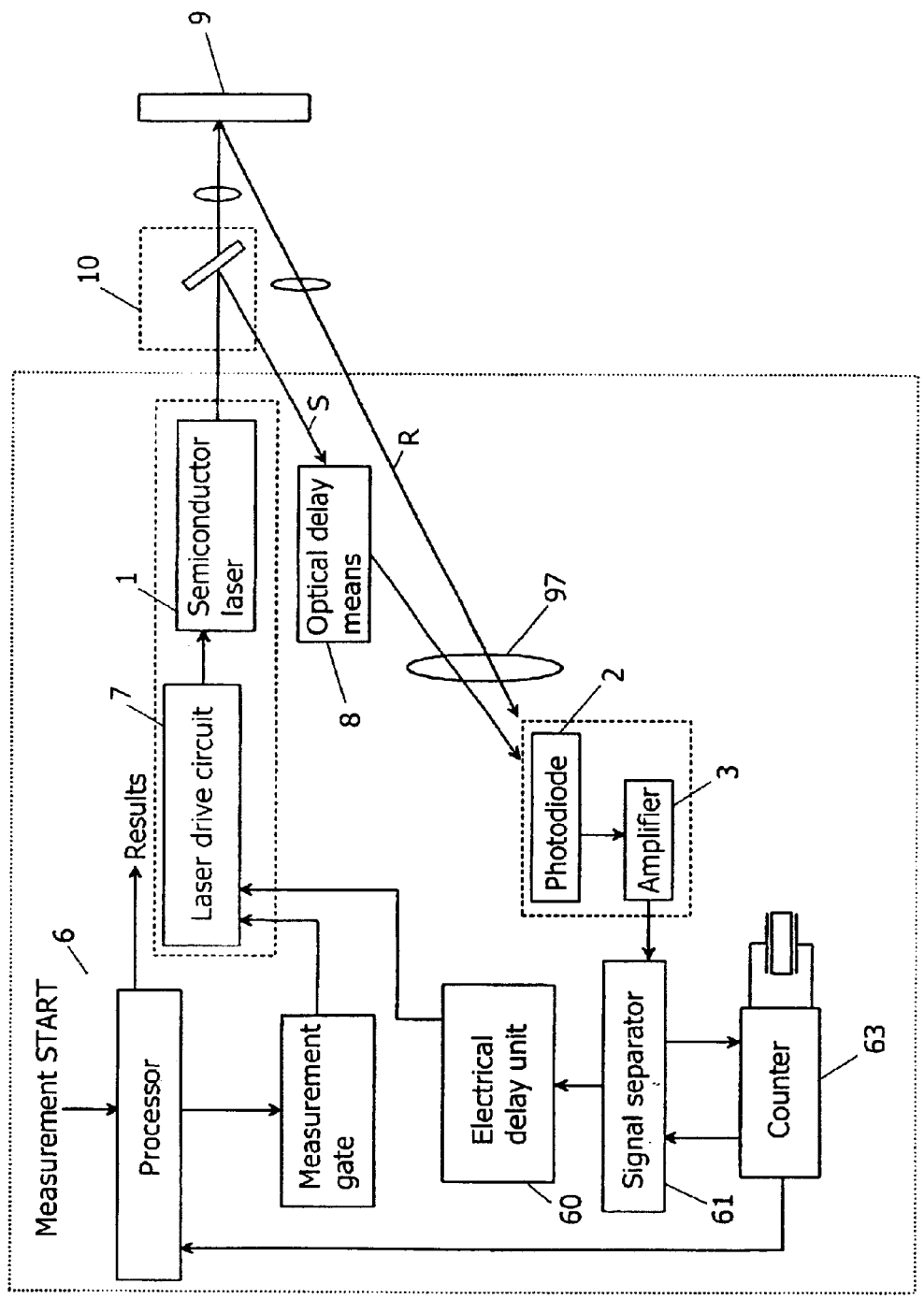
FIG. 18 is a block diagram of a distance measuring apparatus according to another embodiment of the present invention.

To reduce noise components included in the reference wave and the reflection wave, as shown in FIG. 18, it is preferred that a band pass filter 97, through which only the pulsed electromagnetic wave of a specific wavelength used to determine the distance is allowed to pass, is placed in front of the receiver 2.

Figure 19A:
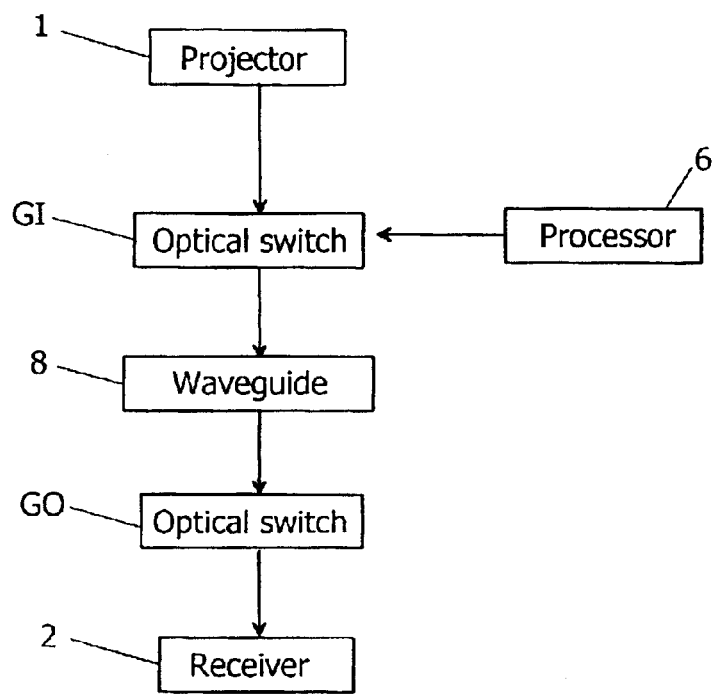
FIGS. 19A and 19B are a block diagram of a distance measuring apparatus using an optical switch and a waveguide according to the present invention, and a time chart showing an operation of the same apparatus, respectively.
Figure 19B:
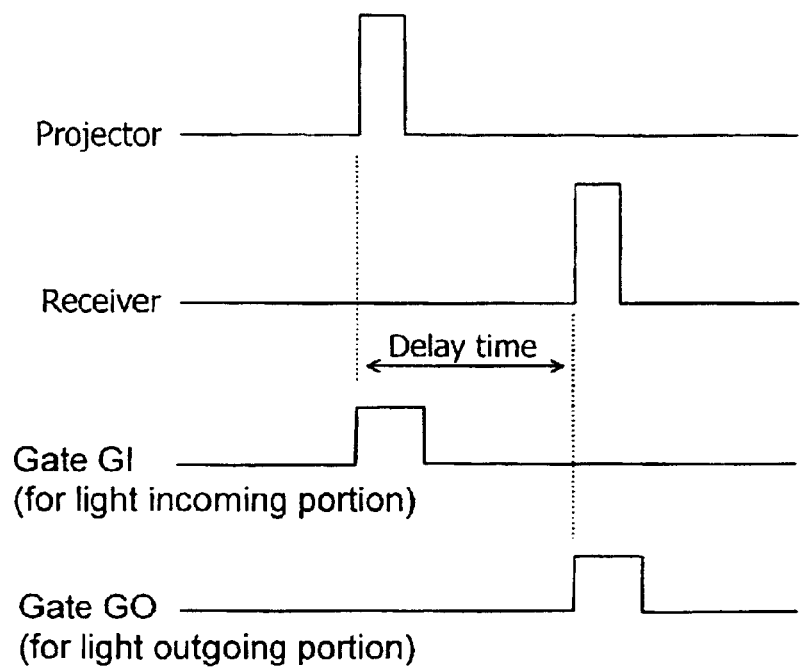

As the countermeasure against the noise components, it is useful to mask the light that comes in the receiver 2. For example, as shown in FIG. 19, to mask the reference wave, when a pair of gates "GI" and "GO" such as optical switches are respectively arranged at light incoming and outgoing portions of the delay means 8, these gates can be opened at the timing of passing the reference wave. Only one of the gates "GI" and "GO" may be formed.

Figure 20:
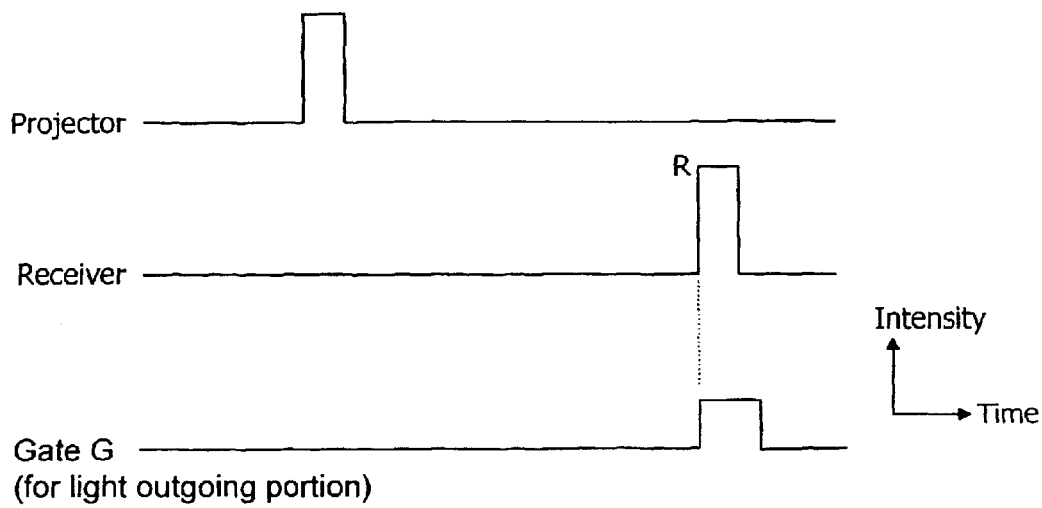
FIG. 20 is a time chart showing an operation of a distance measuring apparatus using a gate "G" according to a preferred embodiment of the present invention
Figure 21:
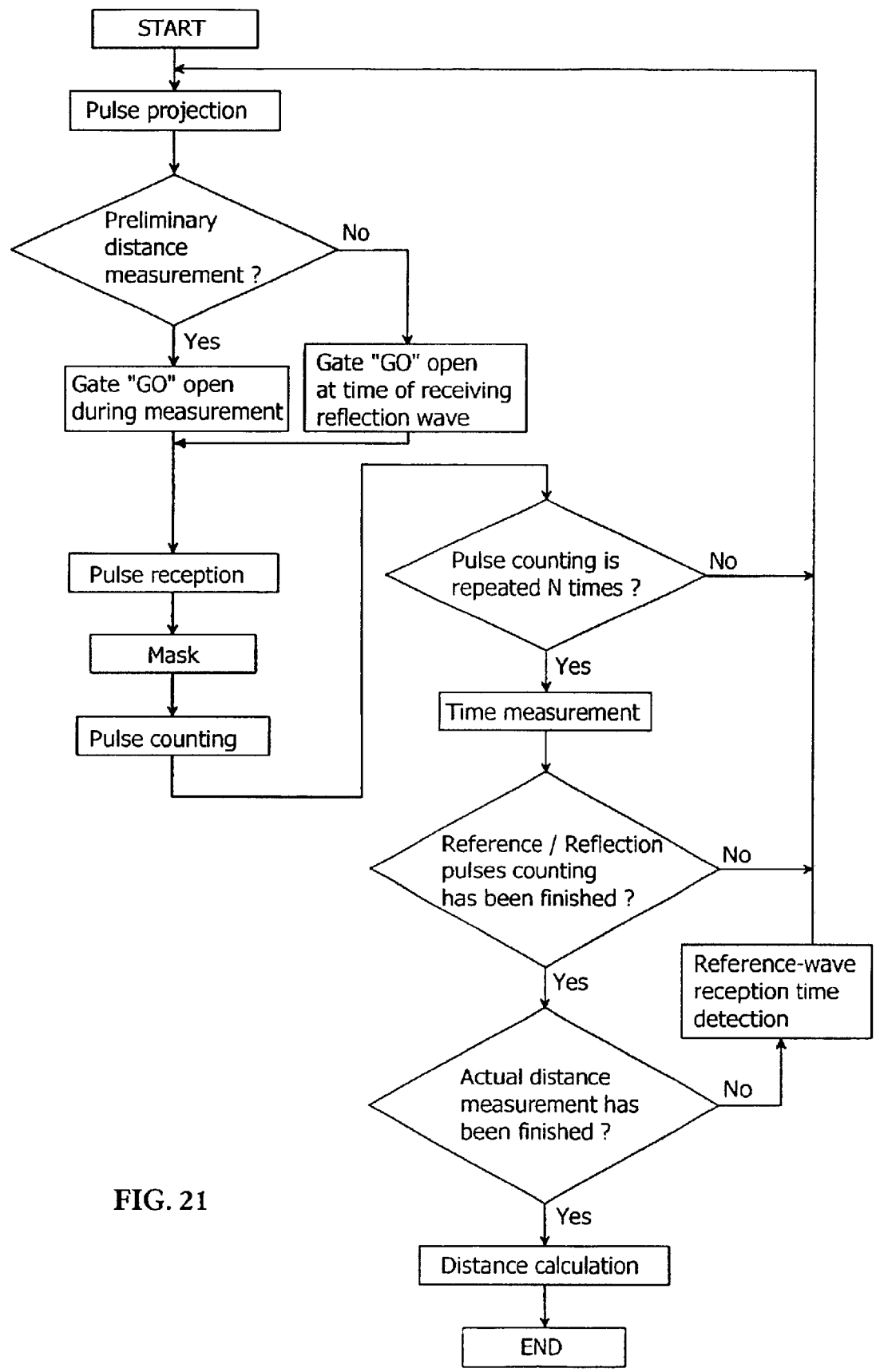
FIG. 21 is a flow chart of the operation of the distance measuring apparatus.

In the case of performing the preliminary and actual measurements, it is preferred that a gate "G" is formed for the reflection wave. In this case, the gate "G" can be opened at the timing of passing the reflection wave. Since the timing of passing the reflection wave changes according to the distance between the apparatus and the object, it is preferred that the gate "G" is always opened during the preliminary measurement, and in the actual measurement, the gate "G" is opened only for a predetermined time period around the reflection-wave reception time obtained by the preliminary measurement, as shown in FIG. 20. FIG. 21 is a flow chart of this case.

Figure 22:
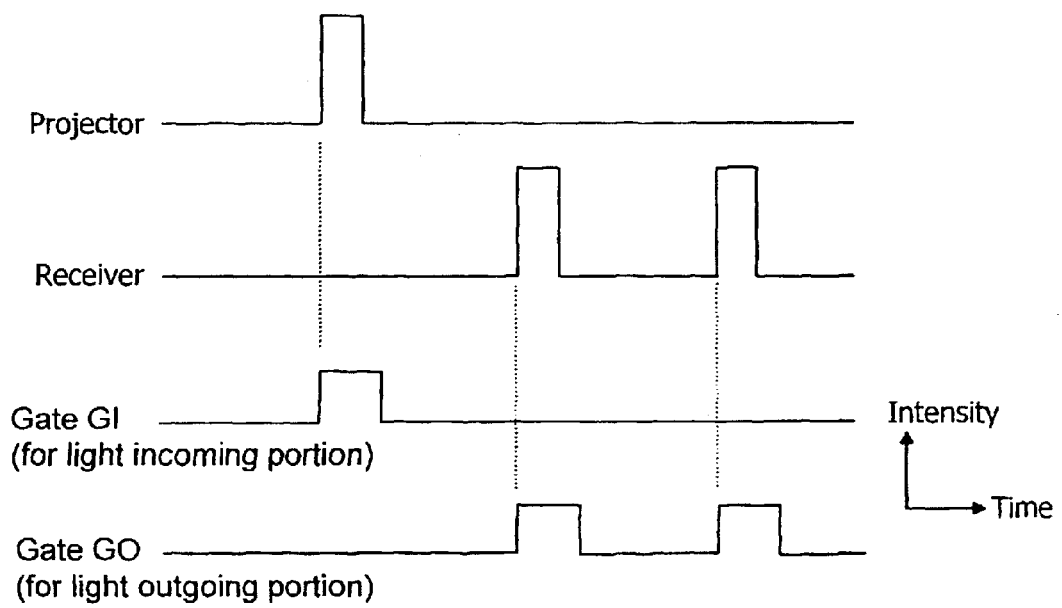
FIG. 22 is a time chart showing an operation of a distance measuring apparatus using a pair of gates "G0" and "GI" according to another preferred embodiment of the present invention
Figure 24:
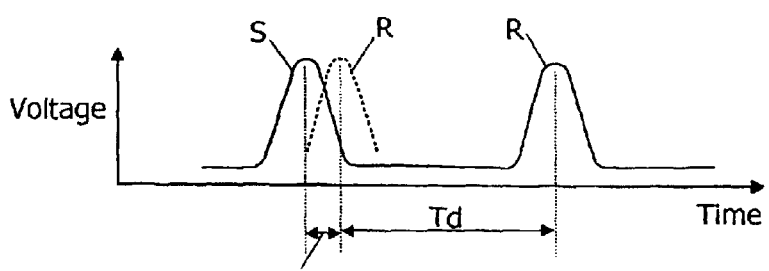
FIG. 24 is a schematic diagram illustrating the principal of a conventional distance measuring method.
Figure 23:
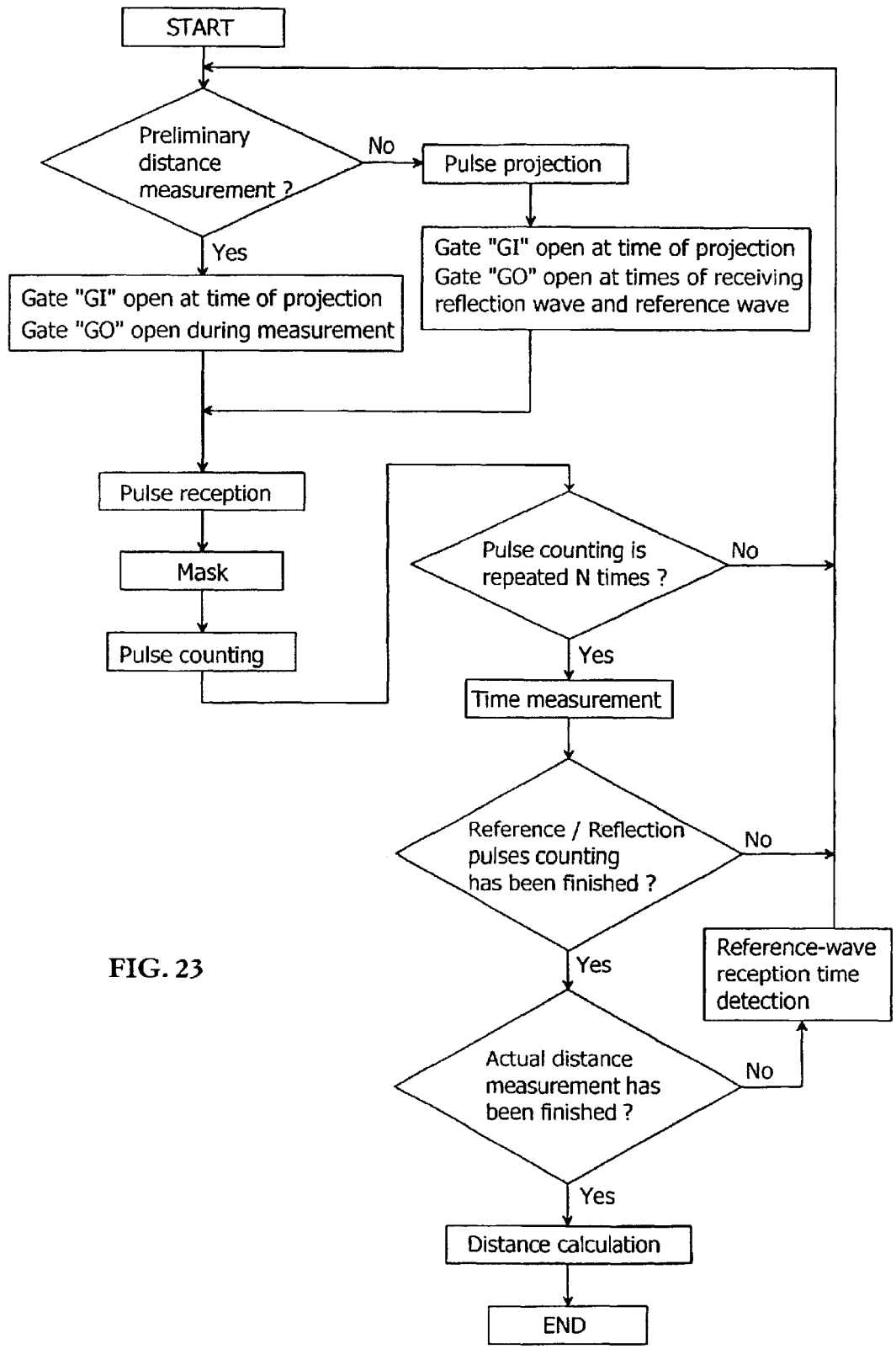
FIG. 23 is a flow chart of the operation of the distance measuring apparatus.

The reference wave and the reflection wave may be allowed to pass through the same gate "GO". FIG. 22 shows timings of opening and closing the gates "GI" and "GO" in the case of allowing the reference wave and the reflection wave to pass through the same gate "GO". In addition, a flow chart of this case is shown in FIG. 23. As the gate "GO", it is preferred to use an optical switch for selectively introducing the reference wave and the reflection wave into the receiver 2.

In the above preferred embodiments, the pulsed laser light was used as the pulsed electromagnetic wave. Alternatively, a pulsed electromagnetic wave having a different wavelength from the laser light may be used.

In addition, to avoid the influence of noise components, it is preferred that a housing of the distance measuring apparatus is made of a resin material. In this case, it is possible to reduce the influence of induction noise generated between electric parts, particularly parts for a high-voltage power supply, and a board for mounting those electric parts.

What is claimed is:

1. A distance measuring apparatus using a pulsed electromagnetic wave including:

a single projector for projecting said electromagnetic wave to an object;

branch means placed between said projector and said object to obtain a reference wave branched from said electromagnetic wave;

a single receiver for receiving said reference wave and a reflection wave obtained when said electromagnetic wave is reflected off said object;

delay means introduced into an optical path for said reference wave extending from said branch means to said receiver without interacting with said object to provide a delay time for delaying a reference-wave reception time, at which said reference wave is received by said receiver, such that a first time period between said reference-wave reception time and an electromagnetic-wave projection time, at which said electromagnetic wave is projected from said projector, is longer than a second time period between said projection time and a reflection-wave reception time, at which said reflection wave is received by said receiver; and a processor for calculating a time difference between said reference-wave reception time and said reflection-wave reception time from outputs of said receiver, and determining a distance between the distance measuring apparatus and said object according to said time difference and said delay time.

2. The distance measuring apparatus as set forth in claim 1, wherein said electromagnetic wave is light, and said delay means is provided by an optical fiber having a predetermined length.

3. The distance measuring apparatus as set forth in claim 1, wherein said electromagnetic wave is light, and said delay means is provided by a plurality of mirrors arranged so as to prolong the optical path for said reference wave.

4. The distance measuring apparatus as set forth in claim 1, wherein said delay means includes:

a reference-wave receiving device used only to receive said reference wave from said branch means;

a delay circuit for delaying an output signal provided from said reference-wave receiving device; and a reference-wave emitting device for providing an output of said delay circuit to said receiver.

5. The distance measuring apparatus as set forth in claim 1, wherein said delay means includes a delay-time adjuster for changing said delay time.

6. The distance measuring apparatus as set forth in claim 1, further including temperature compensating means for compensating for fluctuations of said delay time, which is caused by changes in ambient temperature.

7. The distance measuring apparatus as set forth in claim 1, wherein said electromagnetic wave is light, and the distance measuring apparatus further includes a light-amount adjuster for adjusting a light amount of at least one of said reflection wave and said reference wave received by said receiver.

8. The distance measuring apparatus as set forth in claim 1, wherein said processor allows said projector to make a plurality of projections of said electromagnetic wave to said object, and calculates an average time difference between said reference-wave reception time and said reflection-wave reception time from the outputs of said receiver provided for each of the plurality of projections of said electromagnetic wave to determine the distance according to said average time difference and said delay time.

9. The distance measuring apparatus as set forth in claim 1, wherein said delay means provides said delay time longer than a time period required to allow said electromagnetic wave to pass through double a maximum measurable distance of the distance measuring apparatus.

10. A distance measuring method using a pulsed electromagnetic wave, said method comprising the steps of:

projecting said electromagnetic wave to an object from a single projector;

receiving, by a receiver, a reflection wave obtained when said electromagnetic wave is reflected off said object;

receiving, by the same receiver, a reference wave branched from said electromagnetic wave before said electromagnetic wave reaches said object; and determining a distance from said object according to outputs of said receiver;

wherein a reference-wave reception time, at which said reference wave is received by said receiver, is delayed by a delay time, so that a first time period between said reference-wave reception time and an electromagnetic-wave projection time, at which said electromagnetic wave is projected from said projector, is longer than a second time period between said projection time and a reflection-wave reception time, at which said reflection wave is received by said receiver, and wherein the distance is determined according to said delay time and a time difference between said reference-wave reception time and said reflection-wave reception time.

11. The distance measuring method as set forth in claim 10, wherein said delay time is changed according to a large or small distance from said object.

12. The distance measuring method as set forth in claim 11, wherein a preliminary measurement of roughly determining the distance from said object is performed by using a provisionally-determined delay time, and then said delay time used in an actual measurement of precisely measuring the distance is adjusted according to results of said preliminary measurement.

13. The distance measuring method as set forth in claim 10, wherein said electromagnetic wave is projected to said object plural times, and an average time difference between said reference-wave reception time and said reflection-wave reception time is calculated from the outputs of said receiver provided every projection of said electromagnetic wave, so that the distance is determined according to said average time difference and said delay time.

14. The distance measuring method as set forth in claim 10, wherein a preliminary measurement of roughly determining the distance from said object is performed by using a provisionally-determined delay time, and then a light amount of at least one of said reflection wave and said reference wave received by said receiver in an actual measurement of precisely measuring the distance is adjusted according to results of said preliminary measurement.

* * * * *